US006674688B1

(12) United States Patent
Deal

(10) Patent No.: US 6,674,688 B1
(45) Date of Patent: Jan. 6, 2004

(54) METHOD AND SYSTEM OF ACQUIRING SEISMIC DATA IN AN AREA HAVING PERIODIC ACOUSTIC INTERFERENCE

(75) Inventor: Kevin John Deal, Katy, TX (US)

(73) Assignee: WesternGeco, L.L.C., Houston, TX (US)

( * ) Notice: Subject to any disclaimer, the term of this patent is extended or adjusted under 35 U.S.C. 154(b) by 0 days.

(21) Appl. No.: 09/581,418

(22) PCT Filed: Dec. 11, 1998

(86) PCT No.: PCT/GB98/03723
§ 371 (c)(1),
(2), (4) Date: Jun. 12, 2000

(87) PCT Pub. No.: WO99/31528
PCT Pub. Date: Jun. 24, 1999

Related U.S. Application Data

(60) Provisional application No. 60/069,714, filed on Dec. 16, 1997.

(30) Foreign Application Priority Data

May 13, 1998 (GB) .............................. 9810322

(51) Int. Cl.⁷ .................................. G01V 1/00
(52) U.S. Cl. ............................ 367/38; 367/21
(58) Field of Search .............................. 367/15, 16, 21, 367/22, 23, 24, 38, 43, 50, 51, 56, 20; 181/0.5, 107, 110, 112, 114; 702/14, 17, 18

(56) References Cited

U.S. PATENT DOCUMENTS

| 3,744,021 A | * | 7/1973 | Todd | 367/23 |
| 4,566,083 A | * | 1/1986 | Thigpen | 367/21 |
| 5,424,999 A | * | 6/1995 | Manin | 367/21 |
| 5,548,562 A | * | 8/1996 | Helgerud et al. | 367/14 |
| 5,761,152 A | * | 6/1998 | Jacobsen et al. | 181/110 |

* cited by examiner

Primary Examiner—Marc S. Hoff
Assistant Examiner—Anthony Gutierrez
(74) Attorney, Agent, or Firm—David S. Figatner; Williams, Morgan & Amerson, P.C.

(57) ABSTRACT

A seismic data acquisition method and system are shown. The method acquires seismic data using an acoustic source capable of producing a seismic signal and an acoustic receiver in an area having periodic acoustic interference. The method includes sensing a time window in which the periodic acoustic interference at the acoustic receiver is substantially attenuated, and adjusting the acoustic source's discharge time so a desired portion f a seismic signal produced by the acoustic source arrives at the acoustic receiver within a subsequent time window.

16 Claims, 1 Drawing Sheet

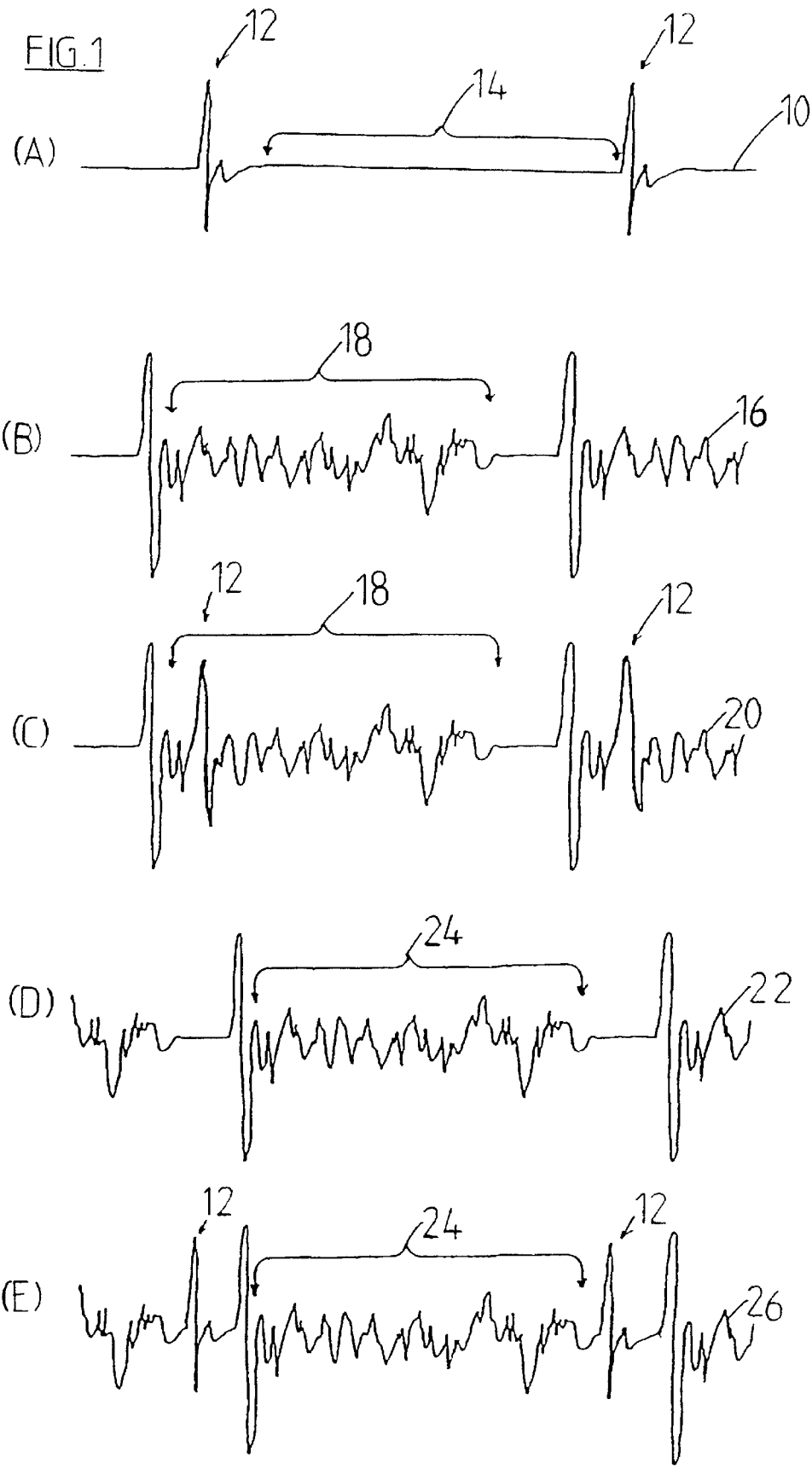

METHOD AND SYSTEM OF ACQUIRING SEISMIC DATA IN AN AREA HAVING PERIODIC ACOUSTIC INTERFERENCE

This application claims the benefit of Provisional application No. 60/096,714, filed Dec. 16, 1997.

FIELD OF THE INVENTION

The present invention relates to a method of acquiring seismic data and particularly to a method of acquiring seismic data in an area having periodic acoustic interference.

Seismic data is typically acquired by conducting a seismic survey over a particular subsurface area of interest, generally in connection with hydrocarbon (oil and/or natural gas) exploration and/or production activities. In order to perform a 3D marine seismic survey, for instance, a plurality of seismic streamers, each typically several thousand meters long and containing arrays of acoustic receivers, known as hydrophones, and associated electronic equipment distributed along its length, are towed at about 5 knots behind a seismic survey vessel, which also tows one or more acoustic sources, typically air guns, that are capable of producing seismic signals. The seismic signals (or "shots") produced by the acoustic sources are directed down through the water into the earth beneath, where they are reflected by the various geologic strata. The reflected signals are received by the hydrophones in the streamers, digitized and then transmitted to the seismic survey vessel, where they are recorded and at least partially processed with the ultimate aim of building up a representation of the earth strata in the area being surveyed. The processed seismic data allows companies to make better decisions regarding where to drill for hydrocarbon deposits and how best to manage the production of hydrocarbons from subsurface reservoirs.

DESCRIPTION OF THE RELATED ART

Data quality problems can arise when seismic data is acquired in an area having periodic acoustic interference. This can occur, for instance, when two seismic survey vessels are carrying out marine seismic surveys in the same general area, say within 50 to 60 kilometers of each other. Acoustic interference occurs when the seismic signals produced by one of the vessels can be detected in the seismic data being gathered by the other vessel. At times, the seismic signals from each of the vessels will interfere with the seismic data being collected by the other vessel. Often, however, due to geology, changes in water depth, or the willingness on some contractors part to collect data that is impaired, only one of the vessels will be affected. The interference will typically be of short duration, perhaps one to two seconds, and the interference will be relatively evenly spaced in time, because the cycle time of the interference will be related to the speed and the desired shot point interval of the seismic survey being conducted by the other vessel.

This type of interference is becoming more and more common as seismic data is being acquired not only in connection with hydrocarbon exploration activities, but also in connection with hydrocarbon production activities. Ongoing seismic monitoring of hydrocarbon reservoirs and integrating this seismic data with wireline log and petrophysical data allows for more effective management of reservoir development and production activities. This increased need to acquire seismic data from hydrocarbon production areas, which are often clustered in relatively limited geographic regions, will tend to increase the frequency at which seismic signals from one seismic survey will interfere with the seismic data being collected by another seismic survey in the same general area.

One method for eliminating this type of interference is for the seismic contractors operating in a particular area to enter into cooperative agreements, referred to in the industry as time share agreements. In these agreements, the seismic data acquisition crews agree to conduct their seismic surveys in a particular area at different times to avoid collecting data showing interference from the other seismic survey crew. There has been a tendency recently, however, for time share agreements to be resisted by some seismic contractors. This has been especially common when dealing with certain Ocean Bottom Cable crews, who claim that their equipment is less susceptible to interference and they should have a 3 to 1 time share agreement because they have more boats on their crew. Both of these claims are highly questionable. A more significant problem with time share agreements, however, is that they are inherently inefficient. By allowing only a single vessel to acquire seismic data in a particular area at any given time, the quantity of seismic data available from that area will be significantly less than the quantity of seismic data that could be acquired by two or more vessels operating in the same area (if each of the vessels could acquire seismic data that was not contaminated by seismic signals from the other vessels).

Another method for attempting to eliminate this type of interference is described in U.S. Pat. No. 5,424,999 (Manin). In the method described in this patent, the spacetime coordinates of the seismic vessels are recorded and the propagation velocity of seismic waves through the off-shore environment is used to calculate the travel time of the noise being produced by the first vessel. This type of method suffers from two primary drawbacks. First, it requires the seismic survey vessels to continuously exchange information regarding their positions and shot timing. In many cases, the vessels will be operated by different operating companies and they will not have an incentive to assist their competitors by providing this type of information. Second, and even more significantly, the non-homogeneous nature of acoustic transmission in a marine environment makes it extremely difficult for this type of method to accurately estimate the travel time of the noise signal. The velocity of sound waves in sea water varies based factors such temperature and pressure. The acoustic velocity of sea water is typically minimized at approximately 1000 feet and this zone of minimum acoustic velocity produces a channeling or lensing effect that causes the acoustic wavefronts to travel in ways that are not predicted by simple spherical spreading models. This non-homogeneous acoustic transmission characteristic makes it virtually impossible to accurately calculate the acoustic pulse travel time between two relatively widely spaced apart marine locations, particularly when these locations are constantly moving with respect to each other.

It should also be noted that some types of non-seismic activities, such as certain types of construction and drilling activities, can also produce periodic acoustic noise and these types of acoustic signals can also interfere with the acquisition of seismic data in the immediate vicinity of these activities.

It is an object of the present invention to alleviate these problems and to improve the quality of seismic data acquired in an area having periodic acoustic interference.

SUMMARY OF THE INVENTION

An advantage of the present method is that it does not require seismic survey vessels (particularly vessels operated by different operating companies) to continuously exchange information regarding their positions and shot timing. A further advantage of the present method is that it does not require the travel time of the noise signal through the non-homogeneous marine environment to be calculated.

According to the present invention, there is provided a method of acquiring seismic data using an acoustic source capable of producing a seismic signal and an acoustic receiver in an area having periodic acoustic interference, the method comprising the steps of determining a time window in which the periodic acoustic interference at the acoustic receiver is substantially attenuated and adjusting the acoustic source's discharge time so a desired portion of a seismic signal produced by the acoustic source arrives at the acoustic receiver within a subsequent time window.

The inventive method may be implemented during a marine seismic survey by performing the following steps: detecting when the periodic acoustic interference at the acoustic receiver is of sufficient magnitude to require adjusting the acoustic source's discharge time; determining the periodic acoustic interference's cycle time; switching the seismic survey vessel's control system from position mode shooting to time mode shooting; adjusting the seismic survey vessel's speed to provide for the proper shot point spacing; determining whether the periodic acoustic interference is arriving at the same time as a desired portion of the seismic signal; if the periodic acoustic interference is arriving at the same time as a desired portion of the seismic signal, then determining what time shift would allow the desired portion of the seismic signal to arrive at the acoustic receiver during a subsequent time window in which the periodic acoustic interference is substantially attenuated and adjusting the acoustic source's discharge time by this time shift; monitoring the periodic acoustic interference and the desired portion of the seismic signal; further adjusting the acoustic source discharge time when required to allow the desired portion of the seismic signal to continue to arrive at the acoustic receiver during a time window in which the periodic acoustic interference is substantially attenuated and further adjusting the vessel's speed when the acoustic source discharge time is further adjusted.

If the duration of the time window where the periodic acoustic interference is substantially attenuated is sufficiently large and the desired portions of the seismic signals arriving at the acoustic receiver are sufficiently short, the desired portions of more than one seismic signal may be received within each successive time window using the inventive method. Similarly, if the minimum cycle time of the acoustic source or some other aspect of the seismic data acquisition system does not allow a desired portion of a seismic signal to be received within each successive time window, the desired portions of the seismic signals may be received at a cycle time that is a multiple of the periodic acoustic interference's cycle time, i.e. the desired portions of the seismic signals may be received once every N time windows, N being greater than or equal to 2.

This method may be used, for instance, to acquire seismic data using a seismic source and a plurality of seismic receivers which are towed behind a seismic survey vessel, in the presence of interfering signals from another acoustic source being operated by another vessel in the same general vicinity.

BRIEF DESCRIPTION OF THE DRAWINGS

The invention will now be described in more detail, with reference to the accompanying drawings.

FIG. 1 shows a suite of segments from seismic data signals illustrating the inventive seismic data acquisition method.

DETAILED DESCRIPTION OF THE INVENTION

FIG. 1(a) represents the type of acoustic signals that may be present in an area having periodic acoustic interference. Seismic trace 10 displays acoustic receiver response amplitude as a function of time and it shows the type of background noise that may be present in an area where a seismic survey is being carried out by another vessel in the same general vicinity. The periodic acoustic interference consists of interference pulses 12 which are separated in time by a time window 14 in which the periodic acoustic interference is substantially attenuated (reduced). Although the amplitude of the periodic acoustic interference within the time window 14 appears to be zero, it should be understood that due to the vast number of alternative travel paths acoustic energy can take in the water and geologic subsurface, the periodic acoustic interference is not typically completely eliminated within this time window, only substantially attenuated.

FIG. 1(b) represents a seismic trace 16 that has been acquired in an area which does not have significant periodic acoustic noise. A desired portion 18 of the seismic signal produced by the acoustic source represents the portion of the seismic data associated with signals from the subsurface area of interest, typically reflection signals associated at with particular depth ranges at which hydrocarbon deposits are most likely. Often seismic traces will include portions, typically at the beginning and end of the seismic signal, that do not contain useful seismic information regarding the subsurface areas of interest. When working in deep water, for instance, there may be a three to four second interval before the first reflections begin to arrive at the acoustic receiver. This part of the seismic signal would not typically be considered part of the desired portion 18 of the seismic signal.

FIG. 1(c) represents a seismic trace 20 that has been acquired in an area having periodic acoustic noise when the desired portion 18 of the seismic signal does not happen to arrive during the time window 14 in which the periodic acoustic interference is substantially attenuated. In this case, an acoustic pulse 12 attributable to the periodic acoustic interference arrives at the acoustic receiver simultaneously with the desired portion 18 of the seismic signal and thus interferes with the seismic data collected by the acoustic receiver. This interfering acoustic signal provides no information regarding the subsurface areas of interest and may make the seismic trace 20 useless, or at least seriously reduce its value, when analyzing the subsurface geology in the area. Identifying and eliminating traces containing this type of noise is typically required before the remaining data can be properly processed and it is often difficult to effectively identify and eliminate the traces containing this type of interference, particularly where the amplitudes and frequencies of the periodic acoustic interference and desired reflection signals are similar.

FIG. 1(d) represents a seismic trace 22 that has been shifted in time from the seismic trace shown in FIG. 1(b). In this case, the desired portion 24 of the seismic signal in seismic trace 22 appears later in the record than the desired portion 18 of the seismic signal in seismic trace 16 because the acoustic source used to produce the desired portion 24 of seismic trace 22 was discharged later in time than the acoustic source used to produce the desired portion 18 of seismic trace 16 in FIG. 1(b).

FIG. 1(e) shows a seismic trace 26 that demonstrates the results that can be achieved when acquiring the time shifted seismic trace 22 shown in FIG. 1(d) in the presence of the periodic acoustic interference 12 shown in FIG. 1(a). The desired portion 24 of the seismic signal now appears within a subsequent time window 14 in which the periodic acoustic interference is substantially attenuated. The acoustic pulses 12 arrive both prior to and after the desired portion 24 of the seismic signal in seismic trace 26 and therefore these pulses do not corrupt the desired portion of the seismic signal data.

It can be seen that to substantially eliminate interference from the periodic acoustic interference, the duration of the time window 14 must be greater than or equal to the duration of the desired portion 24 of the seismic signal. If the duration of the time window 14 is initially less than the duration of the desired portion 24 of the seismic signal, either the time window 14 will need to be increased (allowing less attenuated regions of the periodic acoustic interference to be received with the desired portions of the seismic data), or the duration of the desired portion 24 of the seismic signal will need to be reduced (thereby reducing the portion of the seismic data that the method assures will not be significantly impacted by the periodic acoustic interference).

The steps involved in utilizing the inventive method in a marine environment, referred to by the Applicant as the POPS (Post Pulse Shooting) method, can be summarized as follows:

Determine the period of the interference

Input that period into the vessel's navigation system and shoot in time mode (i.e. at selected predetermined times instead of at selected predetermined locations along the path of the vessel). At this point the interference will be stationary in the shot records.

Adjust the vessel speed to give the correct shot point spacing (such as every 25 meters).

Determine where in the shot record the interference now falls.

Determine how far in time the interference must be moved to be out of the shot record.

Add this time to the nominal period for a single shot and return to the nominal period.

The seismic interference will then be out of the shot record.

Continually monitor the interference and compensate for any changes in the period of interference.

Continually adjust the vessel speed to maintain the correct shot point distance.

The cycle time of the periodic acoustic interference can be expected to change due to changes in the subsurface geology, changes in the relative positions of the vessels, changes in the speed of the vessels, changes in the operating conditions of the device creating the periodic acoustic interference, etc., thereby requiring corresponding adjustments to the acoustic source's discharge times and the seismic acquisition vessel's speed over time.

Seismic survey vessels are typically optimized and automated to run in a position shooting mode, i.e. where the acoustic sources are discharged at selected predetermined locations along the vessel's path. Typically these vessels will continue to run in the position shooting mode until the amplitude of the periodic acoustic interference being received increases to the level where the quality of the data being acquired begins to be or may begin to be affected.

Thus typically, when periodic acoustic interference is detected, it will be monitored and the vessel will begin to use the inventive method only when the amplitude of the periodic acoustic interference exceeds a certain level of concern (i.e. where it may begin to substantially degrade the quality of the seismic data being collected).

The Navigation Field Manual of the Assignee contains the following work instructions allowing seismic survey vessel crew members to implement the inventive method:

2. Actions 2.1 As the interference level increases to a level where it is of concern to the quality of the data, use the shot records to determine its cycle time.
   a) Use the composite shot display which shows a few traces of each shot.
   b) Measure the shift in the interference between shots
   c) Look at the shot interval as displayed on the header.
   d) Add or subtract 2 to get the interference cycle time.

2.2 Ask the bridge to come to the appropriate speed for the time cycle measured.

2.3 Enter the cycle time in the Norstar or Trinav and go into time mode (it is not necessary to wait until the vessel has changed speed).

[note: "Norstar" and "Trinav" are the names of Assignee's seismic survey vessel navigation and control systems]
   a) Now determine where in your record the interference is hitting (it should be hitting the same spot each shot or be slowly moving).
   b) If you have been very lucky the interference will already be outside your shot, if not measure how far you need to shift the interference to get it out of your shot.

If, for example, you have to move the interference 5 seconds "deeper" into your record to get it out from the bottom or your record, shoot a single shot with a shot interval 5 seconds shorter than the nominal. This may not be possible as the cycle time may end up being shorter than the minimum cycle time you can achieve. If that is the case then shoot 2 shots at 2.5 seconds less than the nominal or even 5 shots at 1 second less (whatever it takes to move the interference by those 5 seconds).

If, for example, you need to move the interference "up" the record by 5 seconds then shoot 1 shot with a shot interval 5 seconds longer than the nominal, then switch back to the nominal.

2.4 When the interference is out of the record.

Now the interference is out of the record, it is important not to relax, you must constantly monitor the interference to see whether it is encroaching at the bottom or top of your record. You will find that you will need to change the cycle time by small amounts +/−0.5 seconds to keep it away from the useful part of the record."

The use of the inventive method is not restricted only to seismic data acquisition operations involving a single pair of seismic survey vessels. The above method can be used in any area having periodic acoustic interference, irrespective of whether that interference is caused by one boat, two boats, a boat and a drilling rig, etc.

It should be noted that some types of seismic survey vessels may not have control systems that may be changed from position mode shooting to time mode shooting. In this case, manually adjusting the acoustic source's discharge time in accordance with the inventive method may be necessary.

If the duration of the desired portions of the seismic signals arriving at the acoustic receiver are less than one half of the duration of the time window where the periodic acoustic interference is substantially attenuated, it is possible to receive the desired portions of two or more seismic signals within each successive time window using the inventive method. Similarly, if the minimum cycle time of the acoustic source or some other aspect of the seismic data acquisition system does not allow seismic signals to be received within each successive time window between the pulses of the periodic acoustic interference, acoustic sources may be discharged at appropriate times to allow the desired portions of the seismic signals to be received at a cycle time that is a multiple of the periodic acoustic interference's cycle time, i.e. the desired portions of the seismic signals can be received once every N successive time windows, N being a whole number greater than or equal to 2.

Using the above method, the time lost and expense incurred in connection with periodic acoustic interference can be substantially reduced. For example, in one seismic survey 113 hours were lost due to this type of interference. It was calculated that in another seismic survey subject to this type of interference, the use of the inventive method saved 1017 hours, which is estimated to be equivalent to $2.1 million in cost savings. In addition, no extra data processing steps are needed to process the data and no additional capital outlays are required.

The inventive method can be fully automated by suitably programming a seismic survey vessel's navigation and control system. Additionally, the method can be modified in numerous ways if each vessel is affected by periodic acoustic interference from the others, and/or the vessels are willing to cooperate, the key requirement being that some or all of the vessels change from position mode shooting to time mode shooting. The inventive method may also be used in other applications, including land, transition zone, and ocean bottom cable-based seismic surveys and in situations where downhole and/or permanently installed acoustic sensors are used in an area having periodic acoustic interference. When acquiring seismic data using an array of acoustic receivers, the method may work best when the acoustic interference pulse arrives virtually simultaneously at each of the acoustic receivers in the array (in a towed-streamer marine seismic acquisition context, this typically means that the source of the noise is "on the beam" or "broadside"). This produces the largest time window in which the periodic acoustic interference at each of the acoustic receivers is simultaneously attenuated. This directly contrary to conventional seismic data acquisition practice that attempts to spread out the acoustic interference so the noise does not constructively combine (i.e. "stack up" in seismic data processing jargon) when the seismic data is processed.

What is claimed is:

1. A method of acquiring seismic data using an acoustic source capable of producing a seismic signal and an acoustic receiver in an area having periodic acoustic interference, said method comprising the steps of:
    sensing a time window in which said periodic acoustic interference at said acoustic receiver is substantially attenuated, and
    adjusting said acoustic source's discharge time so a desired portion of a seismic signal produced by said acoustic source arrives at said acoustic receiver within a subsequent time window.

2. A method according to claim 1, further including the step of determining said periodic acoustic interference's cycle time.

3. A method according to claim 2, further including the step of discharging said acoustic source periodically at a cycle time equal to said periodic acoustic interference's cycle time.

4. A method according to claim 1, further including the step of sensing said periodic acoustic interference's amplitude.

5. A method according to claim 1, wherein the step of sensing a time window comprises sensing said periodic acoustic interference using said acoustic receiver.

6. A method according to claim 1, wherein said acoustic source and said acoustic receiver are towed by a seismic survey vessel and said seismic survey vessel's speed is adjusted to compensate for adjustments of said acoustic source's discharge time.

7. A method according to claim 6, wherein said adjustments to said seismic vessel's speed are made to maintain a desired shot point spacing.

8. A method according to claim 1, further including the step of monitoring said periodic acoustic interference and said desired portion of said seismic signal and further adjusting said acoustic source discharge time when required to allow said desired portion of said seismic signal to arrive at said acoustic receiver during a subsequent time window in which said periodic acoustic interference is substantially attenuated.

9. A method according to claim 1, wherein desired portions of N seismic signals arrive at said acoustic receiver within said time window, N being a whole number greater than 1.

10. A method according to claim 1, wherein said acoustic source's minimum cycle time is greater than said periodic acoustic interference's cycle time, and said acoustic source is discharged at a cycle time equal to N times said periodic acoustic interference's cycle time, N being a whole number greater than 1.

11. A method according to claim 1, wherein said step of adjusting said acoustic source's discharge time includes configuring a seismic survey vessel's navigation and control system to result in time mode shooting where said acoustic source is discharged at selected predetermined times rather than at selected predetermined locations along said vessel's path.

12. A method according to claim 1, wherein said steps are performed by a suitably programmed seismic survey vessel navigation and control system.

13. A method of acquiring seismic data using a seismic survey vessel, having an acoustic source capable of producing a seismic signal and an acoustic receiver, in the general vicinity of a second vessel having an acoustic source and wherein an acoustic signal produced by said second vessel's acoustic source may be sensed by said acoustic receiver of said seismic survey vessel, said method comprising the steps of:
    sensing a time window in which said acoustic signal from said second vessel's acoustic source is substantially attenuated, and
    adjusting said seismic survey vessel acoustic source's discharge time so a desired portion of a seismic signal produced by said seismic survey vessel's acoustic source arrives at said acoustic receiver within a subsequent time window.

14. A method of acquiring seismic data using a seismic survey vessel, having one or more acoustic sources capable of producing seismic signals and an acoustic receiver, in an area having periodic acoustic interference, said method comprising the steps of:
    sensing said periodic acoustic interference;
    determining said periodic acoustic interference's cycle time,
    discharging said acoustic sources at said periodic acoustic interference's cycle time, determining whether portions of seismic signals produced by said acoustic sources associated with subsurface depths at which hydrocarbon deposits are most likely arriving at said acoustic receiver in time windows in which said periodic acoustic interference is substantially attenuated near said seismic survey vessel, and adjusting said seismic survey vessel acoustic sources' discharge times so portions of seismic signals produced by said acoustic sources associated with subsurface depths in which hydrocarbon deposits are most likely arriving at said acoustic receiver in said time windows.

15. A seismic survey vessel navigation and control system for a seismic survey vessel having an acoustic source capable of producing a seismic signal and an acoustic receiver for use in an area having periodic acoustic interference, said system comprising:

means for sensing when said periodic acoustic interference at said acoustic receiver is substantially attenuated, and means for adjusting said acoustic source's discharge time so a desired portion of a seismic signal produced by said acoustic source arrives at said acoustic receiver within a subsequent time window.

16. Seismic data acquired using an acoustic source capable of producing a seismic signal and an acoustic receiver in an area having periodic acoustic interference, said seismic data acquired by the process of:

sensing a time window in which said periodic acoustic interference at said acoustic receiver is substantially attenuated, adjusting said acoustic source's discharge time so a desired portion of a seismic signal produced by said acoustic source arrives at said acoustic receiver within a subsequent time window, and recording said desired portion of said seismic signal.

* * * * *